United States Patent
St-Laurent et al.

(10) Patent No.: US 10,711,759 B2
(45) Date of Patent: Jul. 14, 2020

(54) SUBMERSIBLE ELECTRICAL WICKET GATES OPERATOR

(71) Applicant: FRANKLIN EMPIRE, Montreal, QC (CA)

(72) Inventors: Daniel St-Laurent, Longueuil (CA); Thomas Ferland, Varennes (CA); Samuel Bouchard, Montreal (CA); Denis Otth, Longueuil (CA); Donat Picron, Brussels (BE)

(73) Assignee: FRANKLIN EMPIRE, Montreal, Quebec (CA)

( * ) Notice: Subject to any disclaimer, the term of this patent is extended or adjusted under 35 U.S.C. 154(b) by 673 days.

(21) Appl. No.: 15/304,137

(22) PCT Filed: Apr. 16, 2015

(86) PCT No.: PCT/CA2015/000253
§ 371 (c)(1),
(2) Date: Oct. 14, 2016

(87) PCT Pub. No.: WO2015/157852
PCT Pub. Date: Oct. 22, 2015

(65) Prior Publication Data
US 2017/0030324 A1 Feb. 2, 2017

Related U.S. Application Data

(60) Provisional application No. 61/980,122, filed on Apr. 16, 2014.

(51) Int. Cl.
*F03B 3/18* (2006.01)
*F03B 15/04* (2006.01)
*F03B 13/10* (2006.01)

(52) U.S. Cl.
CPC ............. *F03B 3/183* (2013.01); *F03B 3/18* (2013.01); *F03B 13/10* (2013.01); *F03B 15/04* (2013.01);
(Continued)

(58) Field of Classification Search
CPC .. F03B 3/183; F03B 3/18; F03B 13/10; F03B 15/04; F05B 2260/507
See application file for complete search history.

(56) References Cited

U.S. PATENT DOCUMENTS 1,357,440 A * 11/1920 Britcher .................. F03B 3/183
251/298
1,473,391 A * 11/1923 Taylor ..................... F03B 3/183
415/163

(Continued)

FOREIGN PATENT DOCUMENTS

| CH | 652255 | 10/1985 |
| SU | 116455 A1 | 6/1985 |

OTHER PUBLICATIONS

Examination Report, issued in the corresponding Australian patent application No. 2015246602, dated Mar. 26, 2018, 6 pages.
(Continued)

*Primary Examiner* — Zakaria Elahmadi
(74) *Attorney, Agent, or Firm* — Hamre, Schumann, Mueller & Larson, P.C.

(57) ABSTRACT

A system and method for electrically controlling a submersible hydro-electric production system for avoiding leakage of oil and contaminants used in the existing hydraulic systems. The system comprises one or more submersible electrical actuators operably connected to a gate operating ring which in turn is connected to a plurality of wicket gates in the turbine. Each submersible electrical actuator comprises an electrical motor connected to a push-pull rod which is configured to transform the rotation movement received at
(Continued)

a first end thereof to a linear movement at a telescoping end opposite the first end for rotating the gate operating ring to a desired position. The electrical actuator includes a waterproof structure which houses the electrical motor and the push-pull rod and at the same time allows for a telescoping movement of the push-pull rod for rotating the gate operating ring.

16 Claims, 8 Drawing Sheets

(52) U.S. Cl.
CPC ......... *F05B 2260/507* (2013.01); *Y02E 10/22* (2013.01); *Y02E 10/223* (2013.01); *Y02E 10/226* (2013.01); *Y02P 70/525* (2015.11)

(56) References Cited

U.S. PATENT DOCUMENTS

| | | | | |
|---|---|---|---|---|
| 2,084,369 | A * | 6/1937 | Young | F03B 3/183 251/228 |
| 4,419,047 | A * | 12/1983 | Klemm | F03B 3/103 415/150 |
| 4,955,789 | A * | 9/1990 | Chacour | F03B 3/183 248/679 |
| 5,346,359 | A * | 9/1994 | Propst | F03B 3/183 29/407.05 |
| 2004/0101401 | A1 * | 5/2004 | Gerler | F03B 3/183 415/150 |
| 2008/0136191 | A1 * | 6/2008 | Baarnnan | F03B 1/00 290/54 |
| 2009/0021011 | A1 * | 1/2009 | Shifrin | F03B 3/06 290/43 |
| 2012/0146330 | A1 * | 6/2012 | Shifrin | F03B 3/06 290/43 |
| 2013/0277980 | A1 * | 10/2013 | Kiyose | F03B 3/12 290/54 |
| 2014/0326910 | A1 * | 11/2014 | Garrievich | F03B 3/18 251/129.11 |

OTHER PUBLICATIONS

International Search Report issued in International Application No. PCT/CA2015/000253 dated Jul. 13, 2015 (3 pages).
Written Opinion issued in International Application No. PCT/CA2015/000253 dated Jul. 13, 2015 (5 pages).

\* cited by examiner

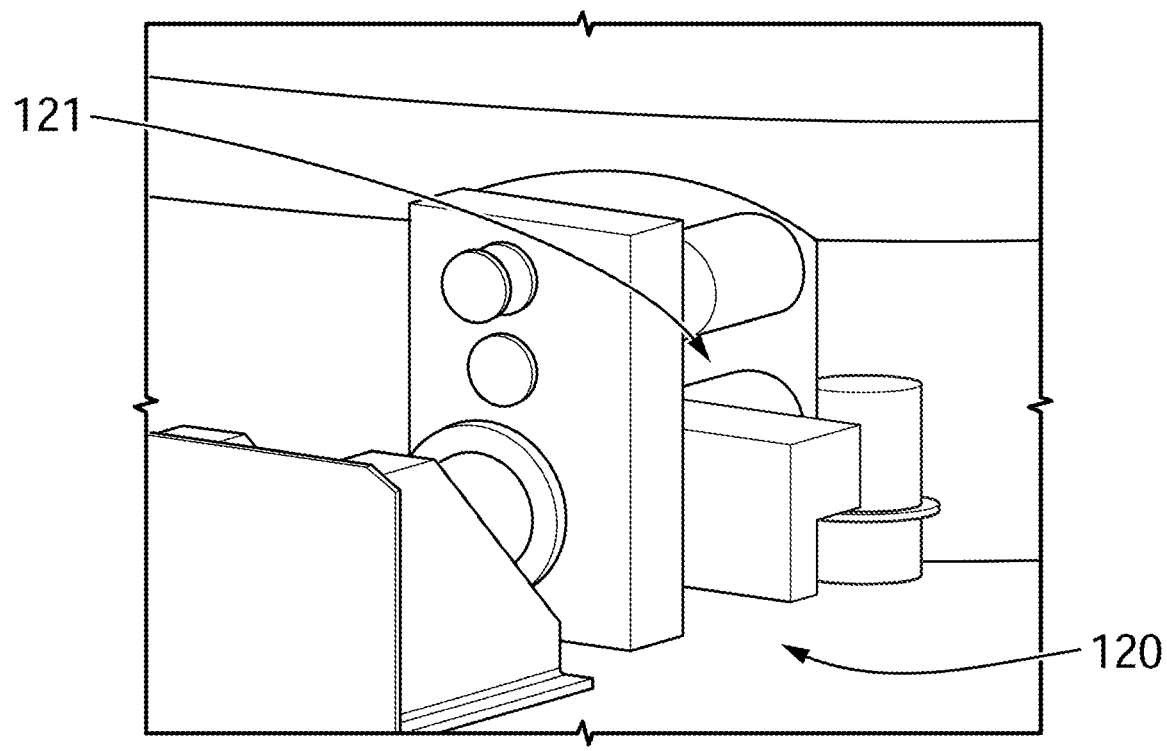
PRIOR ART FIG. 1a
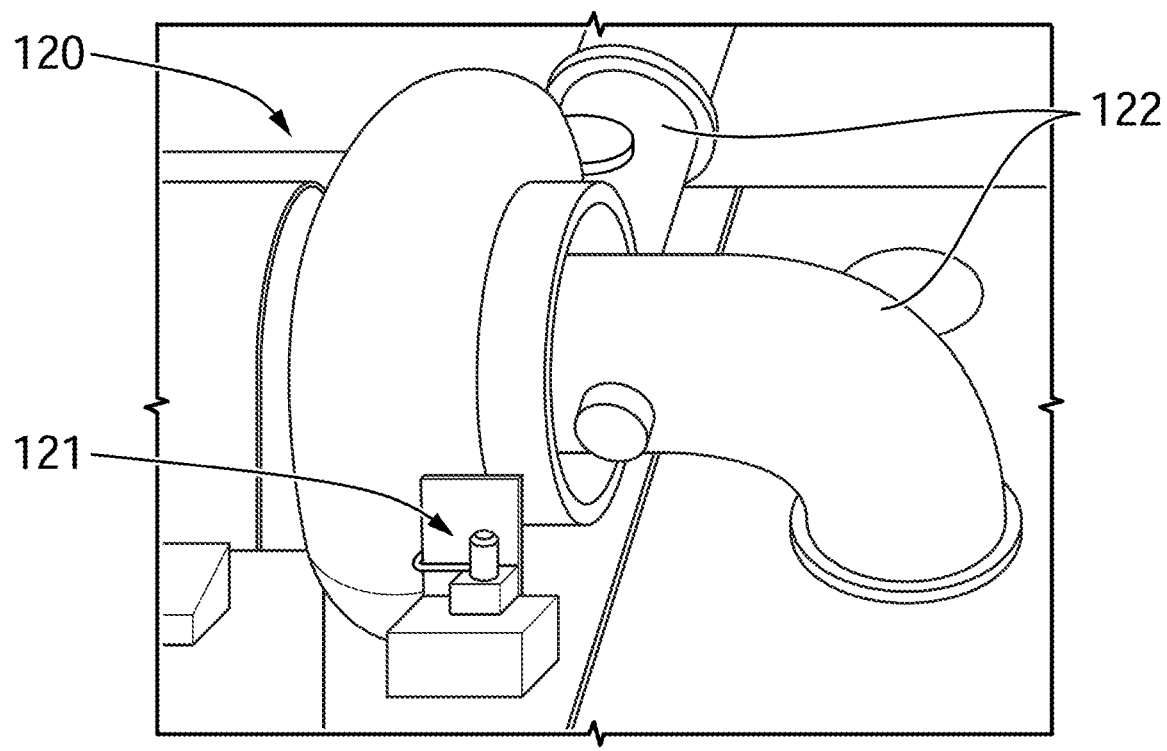
PRIOR ART FIG. 1b

SUBMERSIBLE ELECTRICAL WICKET GATES OPERATOR

CROSS-REFERENCE TO RELATED APPLICATIONS

This application claims priority of U.S. provisional patent application 61/980,122 filed on Apr. 16, 2014, the specification of which is hereby incorporated by reference in its entirety.

BACKGROUND

(a) Field

The subject matter disclosed generally relates to water turbines gate operator.

(b) Related Prior Art

Conventional turbines used to regulate water flow in hydro-electric production are being controlled using oil-based hydraulic cylinders, also called servomotors, to open and close the turbine wicket gates. These hydraulic systems include contaminants such as hydraulic oil in the pressurized lines, pumps, compressors, and pressured oil reservoirs required to sustain the system's operation. These contaminants are present in large quantities and may reach 30,000 liters per turbine and up to 1,000,000 liters in an average dam.

The major disadvantage associated with this type of hydraulic servomotors is the leakage of contaminants such as hydraulic oil into the water.

Excessive oil leakage occurs during normal operations for example during maintenance, or in normal operations due to the age of the system (some systems have been in operation for over 75 years). When the leakage occurs, the oil is released into the environment, polluting the river source.

In addition, system failures (caused by river debris passing through upstream filtering, irregular water flow or mechanical failure in the system) can cause a major hydraulic servomotor immersion up to 3 meters deep, thereby submersing the entire turbine and turbine gates operator system, and releasing significant amounts of oil from the hydraulic system into the river causing severe environmental damage.

Attempts have been made to address this problem. For example, Toshiba International Corp® has designed a non-submersible system in which the water flow is sent via a pipe/conduit to an above-water structure to rotate a turbine which is regulated by an electrical servo motor. An example of this system is shown in FIGS. 1a&1b which illustrates a non-submersible hydro-electric generation system 120 comprising water inlet and water outlet pipes 122 and a servomotor 121 for regulating water flow within the turbine. As shown in FIG. 1a&1b the system 120 is not submersed in the water but provided externally outside the housing of the dam.

However, being a non-submersible system the Toshiba® system is not useful for replacing existing submersible hydro-electric production hydraulic servomotor systems, and thus, the use thereof can only make sense when building new dams, or by performing substantive changes to the structure of the existing dams. The latter is problematic and sometimes impossible from the standpoint of costs, power outage caused by the interruption of operation to perform the change, and sometimes impossible depending on the configuration and structure of the dam.

Therefore, there remains a need for a hydro-electric production system which is environment friendly and at the same time submersible to drop in place of the existing systems hydraulic servomotors.

SUMMARY

The present embodiments describe such system.

In one aspect, there is provided a submersible hydro-electric production system comprising: a turbine comprising a plurality of wicket gates configured to open and close to control a flow of water through the turbine; a wicket gate operating ring operably connected to the plurality of wicket gates for rotating the wicket gates between an open position and a closed position; one or more electrical actuators operably connected to the wicket gate operating ring and configured to rotate the gate operating ring to a desired position in response to a control signal. Each electrical actuator comprising an electrical motor and a push-pull rod operably connected to the electrical motor for transforming a rotation movement of the electrical motor to a linear movement for rotating the gate operating ring to the desired position.

The electrical actuator may be provided in a waterproof housing. The waterproof housing may comprise a waterproof casing comprising a flexible membrane, the casing for housing the electrical motor; and a telescoping tube protruding through the flexible membrane, the telescoping tube being configured to house the push-pull rod and extend and retract following the linear movement of the push-pull rod.

The system may also comprise a waterproof power unit for providing the control signal received from outside the housing to the electrical motor.

In an embodiment, the casing, the membrane, the power unit and the telescoping tube conform to an IP68 waterproofing standard.

The system may also comprise a first electrical actuator and a second electrical actuator connected at opposite sides of the gate operating ring. The first actuator and the second actuator may have linear movements which are identical in speed and opposite in directions for rotating the gate operating ring.

The push-pull rod may comprise a primary shaft for connecting to a rotation shaft of the electrical motor; and a cylinder comprising a plurality of secondary shafts provided around the primary shaft, the secondary shafts being connected to the cylinder and configured to cause linear movement of the cylinder upon rotation of the primary shaft.

The electrical motor may be a servomotor.

In another aspect there is provided an electrical actuator for controlling an opening and a closing of a wicket gate operating ring in a submersible hydro-electric production system, the electrical actuator comprising: an electrical motor having a rotation shaft; a push-pull rod for connecting to the wicket gate operating ring, the push-pull rod being operably connected to the rotation shaft and being configured to transform a rotation movement of the rotation shaft to a linear movement for rotating the gate operating ring to a desired position.

The electrical actuator may be submersible and may comprise an IP68 waterproof housing.

The waterproof housing may include a waterproof casing comprising a flexible membrane, the casing for housing the electrical motor; and a telescoping tube protruding from the flexible membrane, the telescoping tube being configured to house the push-pull rod and being configured to extend and retract following the linear movement of the push-pull rod.

The push-pull rod may comprise a primary shaft for connecting to a rotation shaft of the electrical motor; and a cylinder comprising a plurality of secondary shafts provided around the primary shaft, the secondary shafts being connected to the cylinder and configured to cause linear movement of the cylinder upon rotation of the primary shaft.

In a further aspect, there is provided a method for controlling operation of a submersible hydro-electric production system comprising a plurality of wicket gates connected to a gate operating ring, the method comprising: providing a push-pull rod which is configured to transform a rotation movement received at a first end thereof to a linear movement at a telescoping end thereof, the telescoping end being opposite to the first end; connecting the first end of the push-pull rod to an electrical motor for moving the telescoping end in a linear manner upon rotation of the first end, the linear movement of the telescoping end for rotating the gate operating ring; and providing a waterproof structure for housing the electrical motor and the push-pull rod therein.

In an embodiment, providing a waterproof structure comprises: providing the electrical motor in a waterproof housing having a flexible membrane; and providing the push-pull rod in a waterproof telescoping tube extending through the flexible membrane.

The method may also include connecting the telescoping tube to the gate operating ring.

In another embodiment, the method may include: providing two different electrical motors and connecting telescoping tubes associated with the two different electrical motors to opposite sides of the gate operating ring; and configuring the two electrical motors to rotate in opposite directions to cause rotation of the gate operating ring.

In yet a further aspect, there is provided an electrical actuator for controlling operation of a wicket gate operating ring connected to a plurality of wicket gates in a submersible hydro-electric production system, the electrical actuator comprising: an electrical motor having a rotation shaft; a push-pull rod for connecting to the wicket gate operating ring, the push-pull rod being operably connected to the rotation shaft and being configured to transform a rotation movement of the rotation shaft to a linear movement for rotating the gate operating ring to a desired position. The electrical actuator being submersible and comprising a waterproof housing comprising a waterproof casing comprising a flexible membrane and a telescoping tube extending through the flexible membrane, the waterproof casing being adapted to receive the electrical motor, and the telescoping tube being adapted to receive and be connected to the push-pull rod and extend and retract following the linear movement of the push-pull rod.

According to an embodiment, there is provided a submersible hydro-electric production system comprising: at least one actuator comprising an electrical servomotor and a push-pull rod operably connected to the electrical servomotor to transform rotation of the electrical servomotor into an linear movement; a turbine comprising a plurality of blades configured to open and close to control water flow through the water turbine; and a gate operating ring operably connected to the turbine blades on one side and to the actuator on other side for controlling operation of the blades in accordance with the axial movement of the actuator.

In an embodiment, the system comprises one or more actuators connected to opposite sides of the gate operating ring and being configured to operate in one complete system of gate operation.

In a further embodiment, the actuator is suitable for permanent submersion in water and conforms to the IP68 standard.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 1a and 1b illustrates a conventional non-submersible hydro-electric generation system;

It will be noted that throughout the appended drawings, like features are identified by like reference numerals.

DETAILED DESCRIPTION

The embodiments describe a system and a method for electrically controlling a submersible hydro-electric production system for avoiding leakage of oil and contaminants used in the existing hydraulic systems. The system comprises one or more submersible electrical actuators operably connected to a gate operating ring which in turn is connected to a plurality of wicket gates in the turbine. Each submersible electrical actuator comprises an electrical motor connected to a push-pull rod which is configured to transform the rotation movement received at a first end thereof to a linear movement at a telescoping end opposite the first end for rotating the gate operating ring to a desired position. The electrical actuator includes a waterproof structure which houses the electrical motor and the push-pull rod and at the same time allows for a telescoping movement of the push-pull rod for rotating the gate operating ring.

Figure 2A:
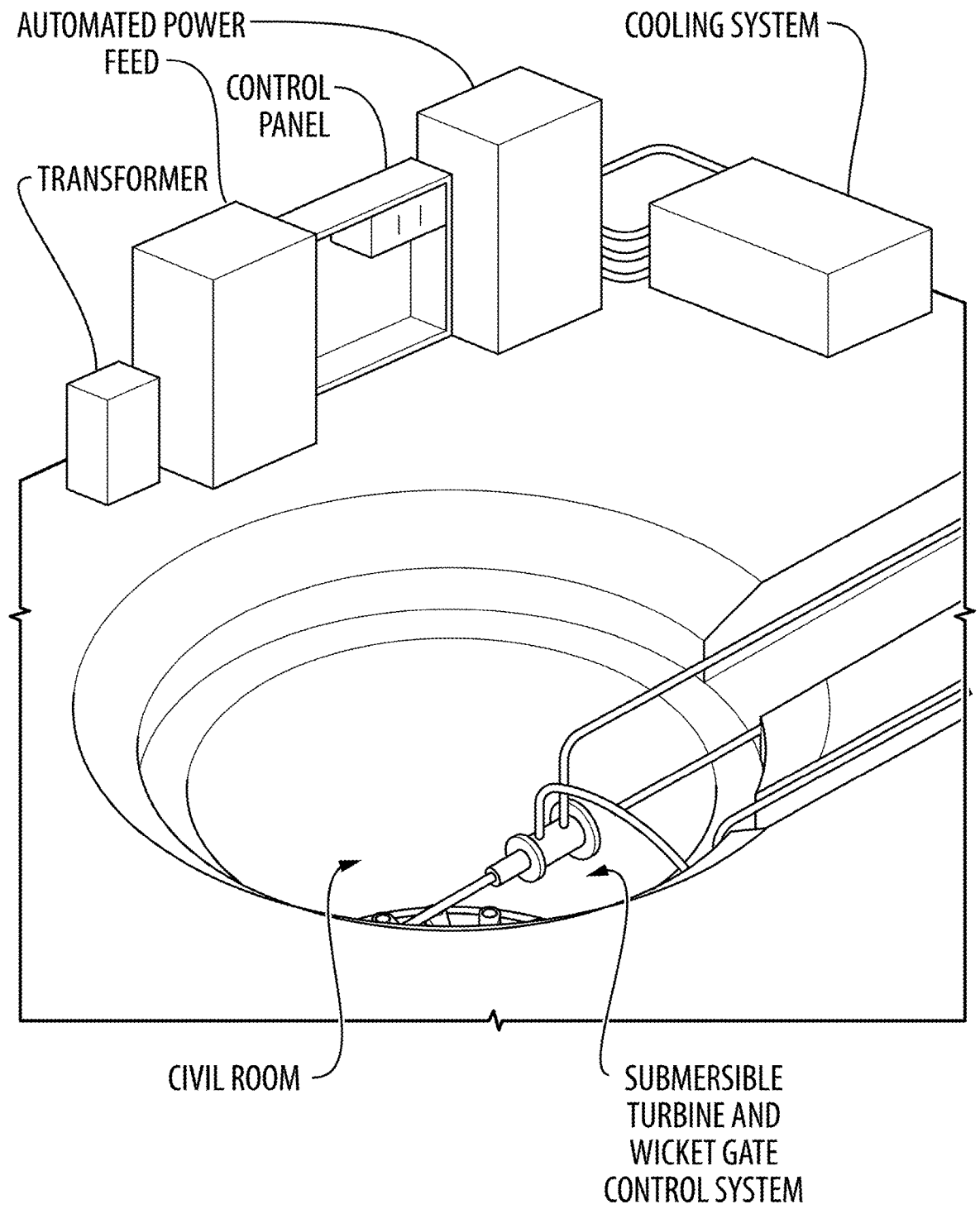
FIGS. 2a and 2b are 3D illustrations illustrating the working environment of a submersible hydro-electric production system, in accordance with an embodiment.
Figure 2B:
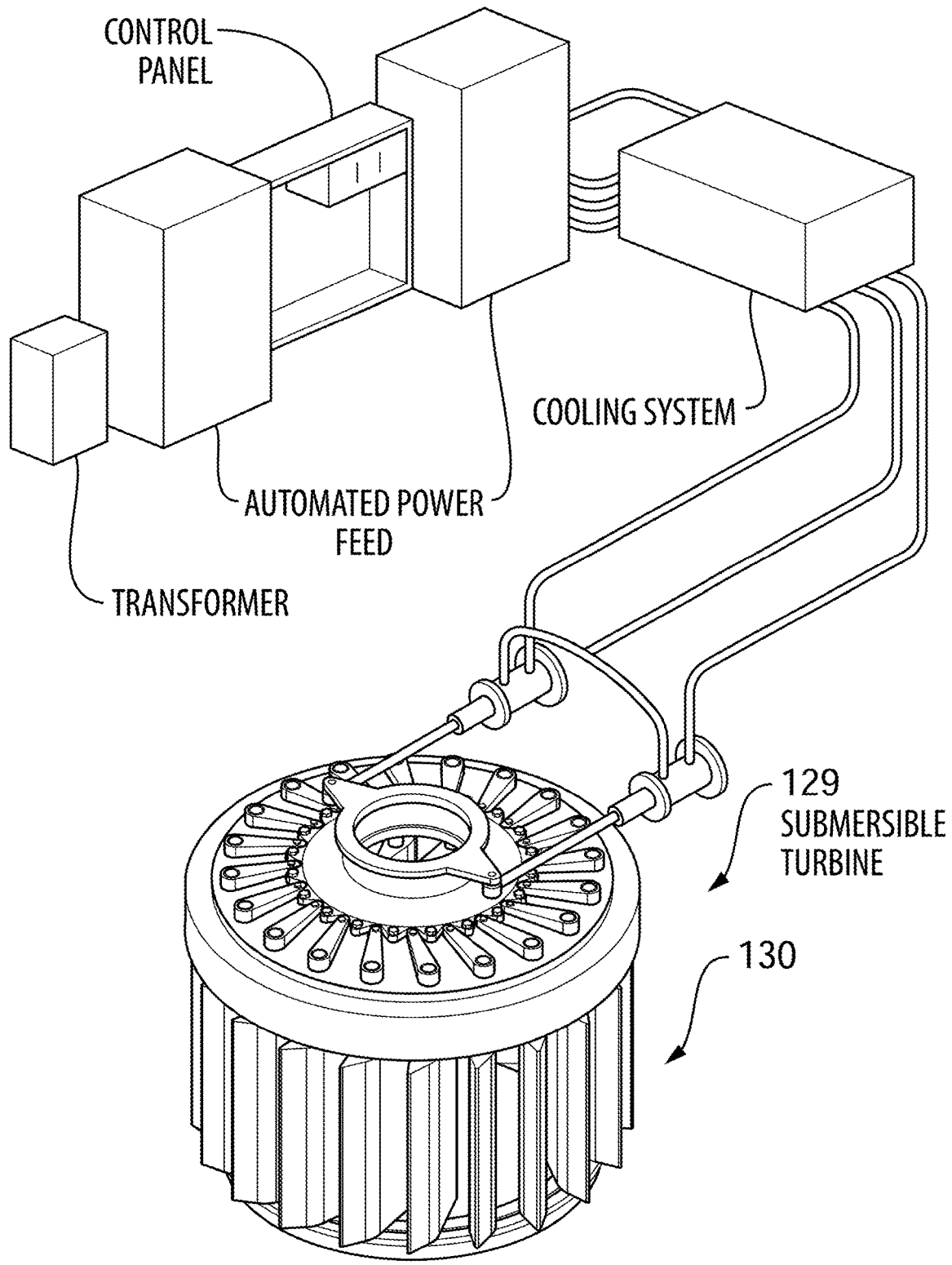

FIGS. 2a and 2b are 3D illustrations illustrating the working environment of a submersible hydro-electric production system, in accordance with an embodiment.

As shown in FIGS. 2a & 2b the working environment comprises submersible and non-submersible modules. The non-submersible modules include a tension transformer, an automated power feed module, a control panel, an autonomous power source (not shown), a cooling system for controlling the control panel, and a non-submersible wicket gates control system.

Figure 3A:
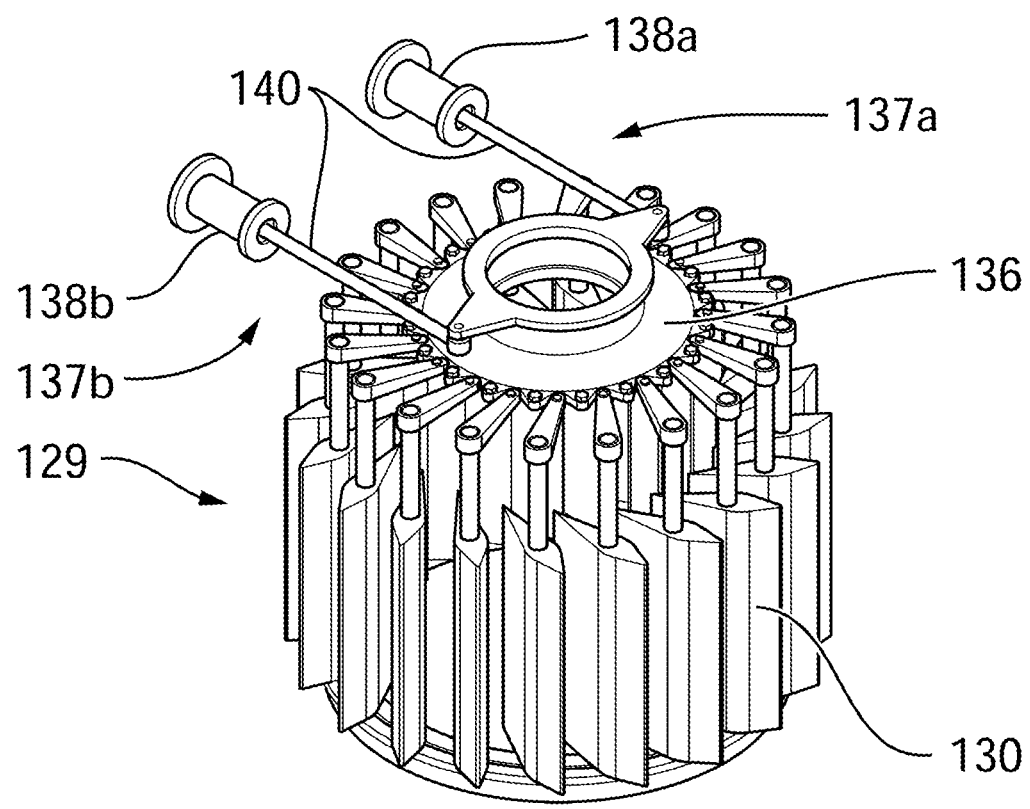
FIG. 3a is a closer view of the submersible hydro-electric production system, in accordance with an embodiment.

The submersible modules include a submersible turbine 129 including a plurality of wicket gates 130 connected to a wicket gate ring 136 (aka wicket gate operating ring) shown in FIG. 3a, and a wicket gate operator system comprising one or preferably a couple of electrical actuators 137 connected to opposite sides of the wicket gates ring 136. The submersible parts may be provided in a civil room housing structure (below the non-submersible components and modules) as exemplified in FIG. 2a to control generation of power from the incoming water flowing through the wicket gates 130, in accordance with electricity demand, water level and other parameters.

Figure 3B:
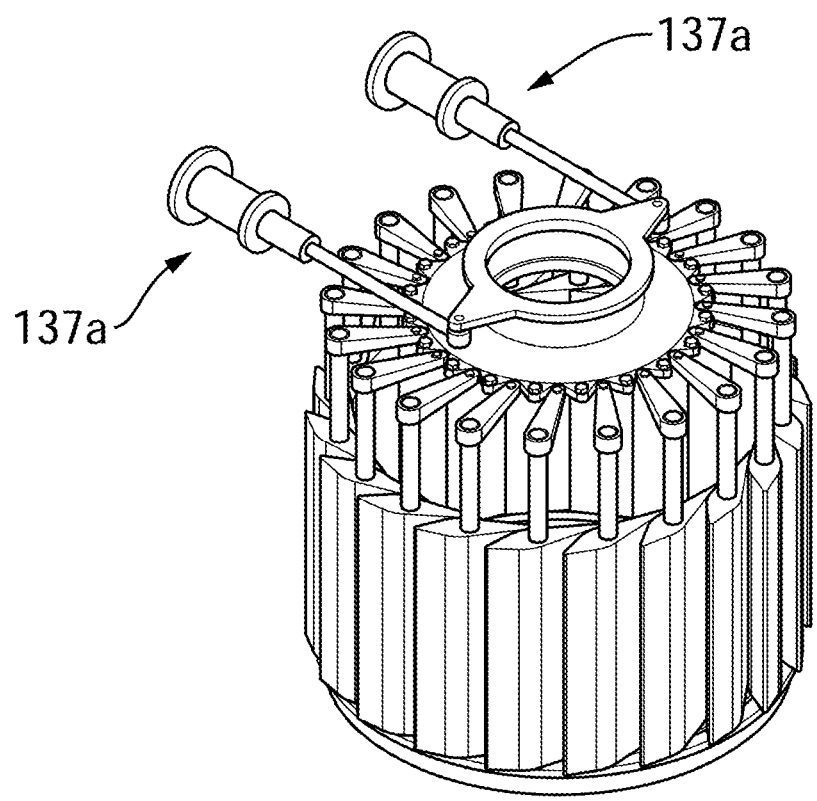
FIG. 3b exemplifies how the linear movement of the electrical actuators causes rotation of the operate the wicket gate ring, in accordance with an embodiment.

FIG. 3a is a closer view of the submersible hydro-electric production system, in accordance with an embodiment, and FIG. 3b exemplifies how the linear movement of the electrical actuators causes rotation of the operate the wicket gate ring, in accordance with an embodiment.

In an embodiment, the flow of water through the turbine 129 and subsequently the rotation speed of the turbine and the hydro-electric production are controlled using a couple of electrical actuators 137 connected to opposite sides of the wicket gate ring 136 for opening and closing the wicket gates 130 in response to a control signal received from the control panel. In an embodiment, each actuator 137 comprises an electrical servomotor 138.

In a non-limiting example of implementation, each actuator 137 may have a diameter of 1 meter and an average length of 3.5 meters. Combined, the two actuators 137 may have a nominal capacity of 640.6 KN, a nominal system power of 94 KW, and a weight of 6.1 Metric tons.

As exemplified in FIG. 3a, the turbine 129 comprises a plurality of wicket gates 130 and a gate operating ring 136 connected to the wicket gates 130. As discussed above, the wicket gates operator system comprises two or more actuators 137a and 137b. The actuators 137 are configured to have the exact axial displacement and at the same speed but in opposite directions in order to rotate the wicket gate ring 136 to a desired position as dictated by the control panel. Each actuator 137 comprising an electrical servomotors 138 e.g. servomotors, attached to a linear push-pull rod 140 (aka push rod). The servomotors 138 are configured to push/pull the shafts 140 in an axial manner as exemplified in FIG. 3b which shows the actuator 137a in a push position and the actuator 137b in a pull position. The shafts 140 are connected to opposite sides of the gate operating ring 136 for opening and closing the wicket gates 134 of the turbine 130 following signals received from the control panel following the command of hydro-electrical governor system controlling generation of the hydro-electric power.

Accordingly, when a given actuator 137a pushed on the wicket gate ring 136, the other actuator 137b would simultaneously pull on the opposite side of the wicket gate ring 136 using the same speed/force/displacement but in the opposite direction, thus causing rotation of the ring 136 in a given direction as dictated by the control panel.

Figure 4:
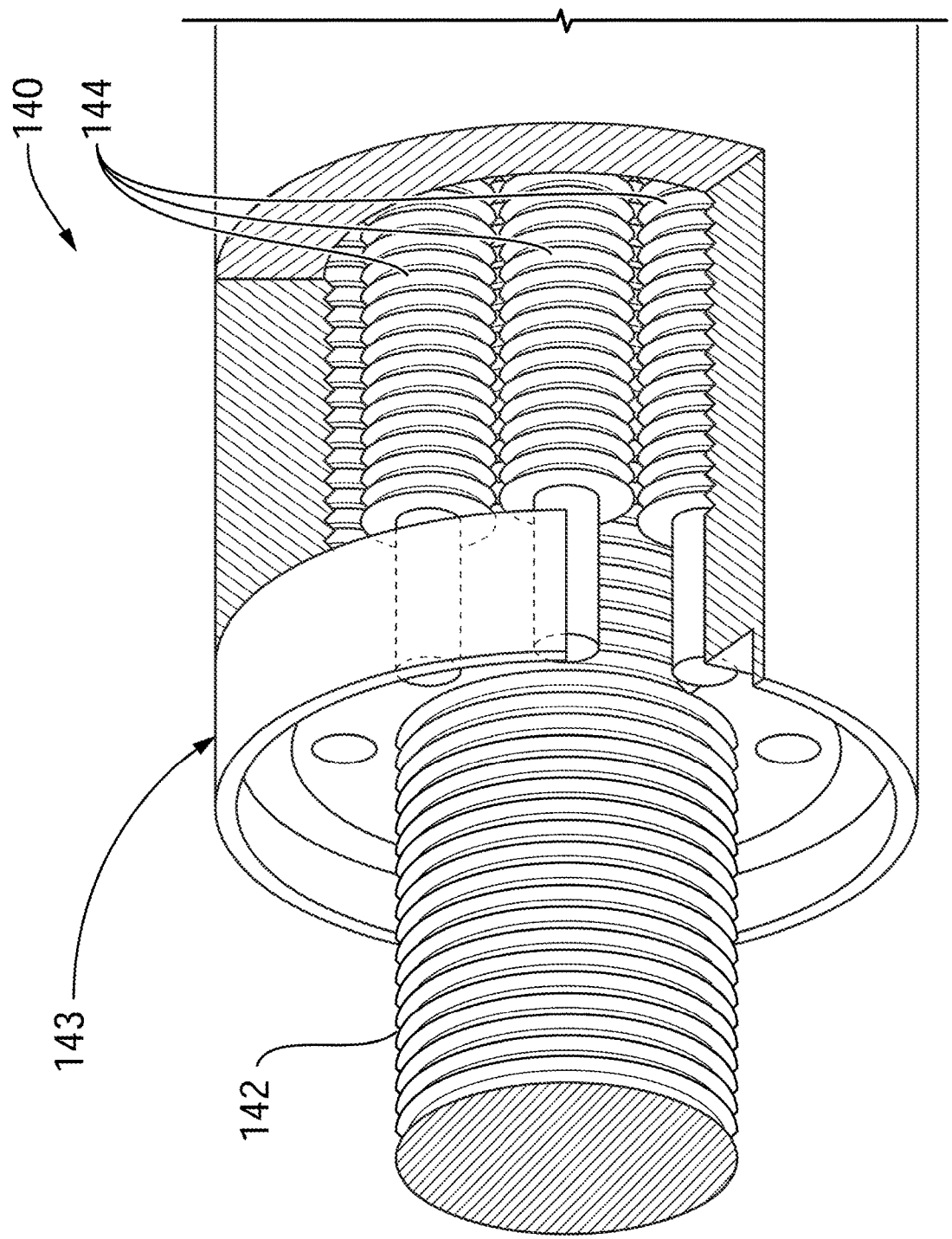
FIG. 4 illustrates an exemplary configuration of a push-pull rod for transforming the rotation movement of a motor into an axial movement.

As discussed above, the rotation shaft of each servomotor 138 may be attached to a push-pull rod 140 to convert the rotational movement to a linear movement as exemplified in FIG. 4.

FIG. 4 illustrates an exemplary configuration of a push-pull rod for transforming the rotation movement of an electrical servomotor into a linear (push/pull) movement.

Figure 5A:
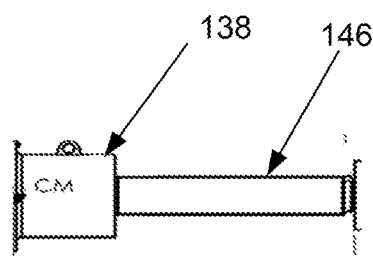
FIGS. 5a and 5b illustrates the electrical servomotor actuators in a retracted position and in an extended position, respectively.
Figure 5B:
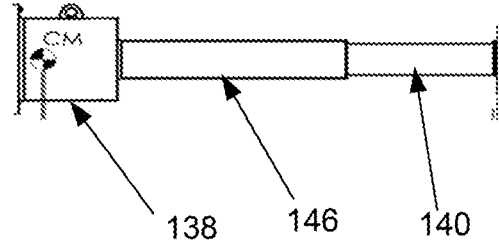

As shown in the example of FIG. 4, the push-pull rod 140 comprises a threaded shaft 142, a cylinder/chassis 143 and a plurality of threaded elements 144 attached to the cylinder 143, and matching the threads of the threaded shaft 142. In operation, the rotation shaft 142 is attached to the rotation shaft of the servomotor 138. As the threaded shaft 142 rotates in a given direction, and since the cylinder 143 is attached to the wicket gate ring 136 and cannot rotate with the shaft 142, the rotation movement of the shaft 142 causes the cylinder 143 to move forward or backward axially within the push-pull rod housing 146 (as exemplified in FIGS. 5a and 5b), thus, translating the rotation movement of the servomotors 138 to an axial movement for controlling the opening of the wicket gates 134 via the wicket gate operating ring 136. The cylinder 143 may be provided in a push-pull rod housing 146. FIG. 5a illustrates the actuator in a retracted position while FIG. 5b illustrates the actuator in an extended position.

Since the actuators are directly exposed to the water, it would be important to waterproof these actuators and the entire assembly of shafts associated with each actuator to prevent rust and ensure prolonged operation. In an embodiment, the waterproofing structure described herein conforms to the IP68 waterproofing standard.

Figure 6A:
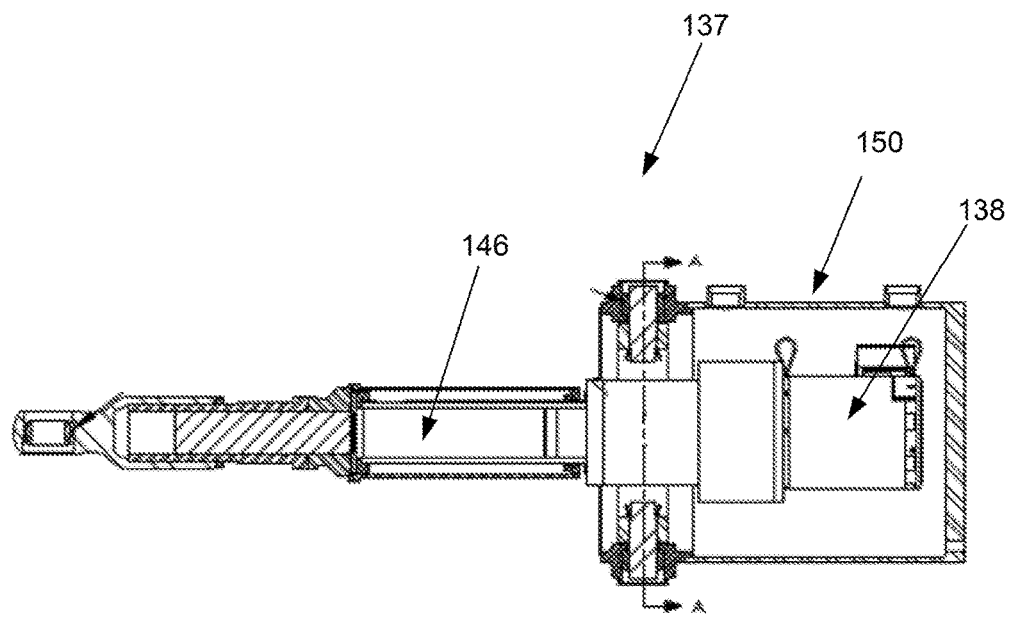
FIGS. 6a to 6c illustrate an embodiment of the sealing system provided for waterproofing the actuators and their associated shafts.
Figure 6B:
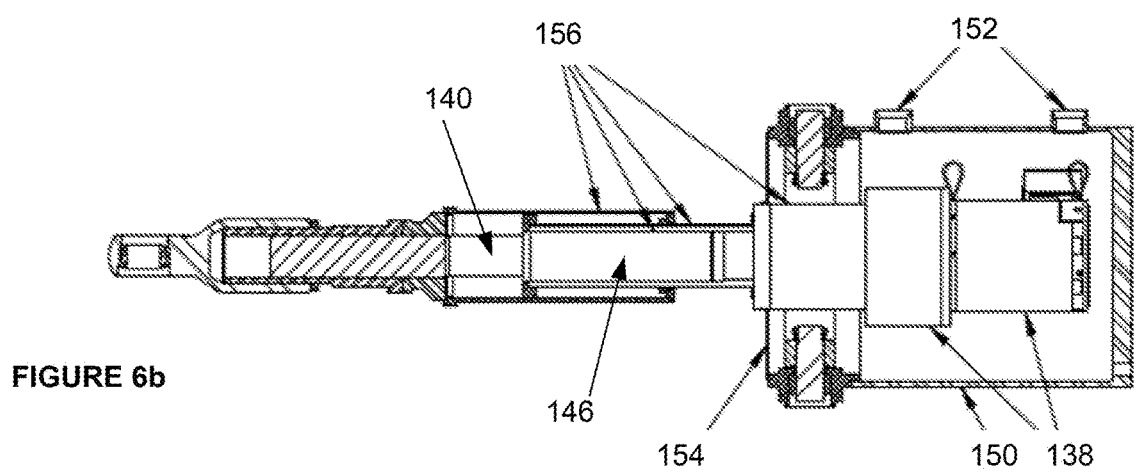
Figure 6C:
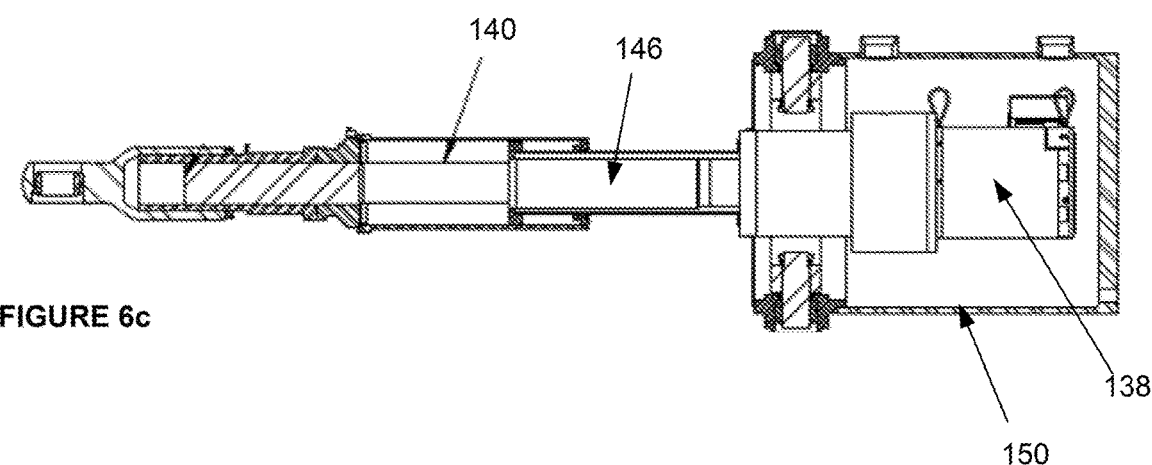

FIGS. 6a to 6c illustrate an embodiment of the sealing system provided for waterproofing the actuators and their associated shafts. FIG. 6a illustrates the actuator in fully retracted position. FIG. 6b illustrates the actuator in a semi-extended position, and FIG. 6c illustrates the actuator in a fully extended position.

As shown in FIGS. 6a to 6c each servomotor 138 is provided in a waterproof housing 150. In an embodiment, the housing 150 may include a water tight IP68 electric/power control unit 152 for providing the control/power signal to the servomotor through the housing 150 in a secure manner, and a flexible and water tight membrane 154 through which extends an IP68 telescoping water tight actuator tube 156. The membrane is designed to be flexible to absorb vibrations, shaking and diverse movements incurred during operation of the turbine such as sudden opening, closing etc. The telescoping water tight actuator tube 156 encompasses and includes the push-pull rod housing 146 and the push rod 140 of the servomotor 138 in a manner that allows the push rod to extend and retract within the tube 156 in waterproof manner as exemplified in FIGS. 6a to 6c, whereby the actuator 137 may operate in a water environment without affecting the durability of the servomotor and associated power transmission elements.

Figure 7:
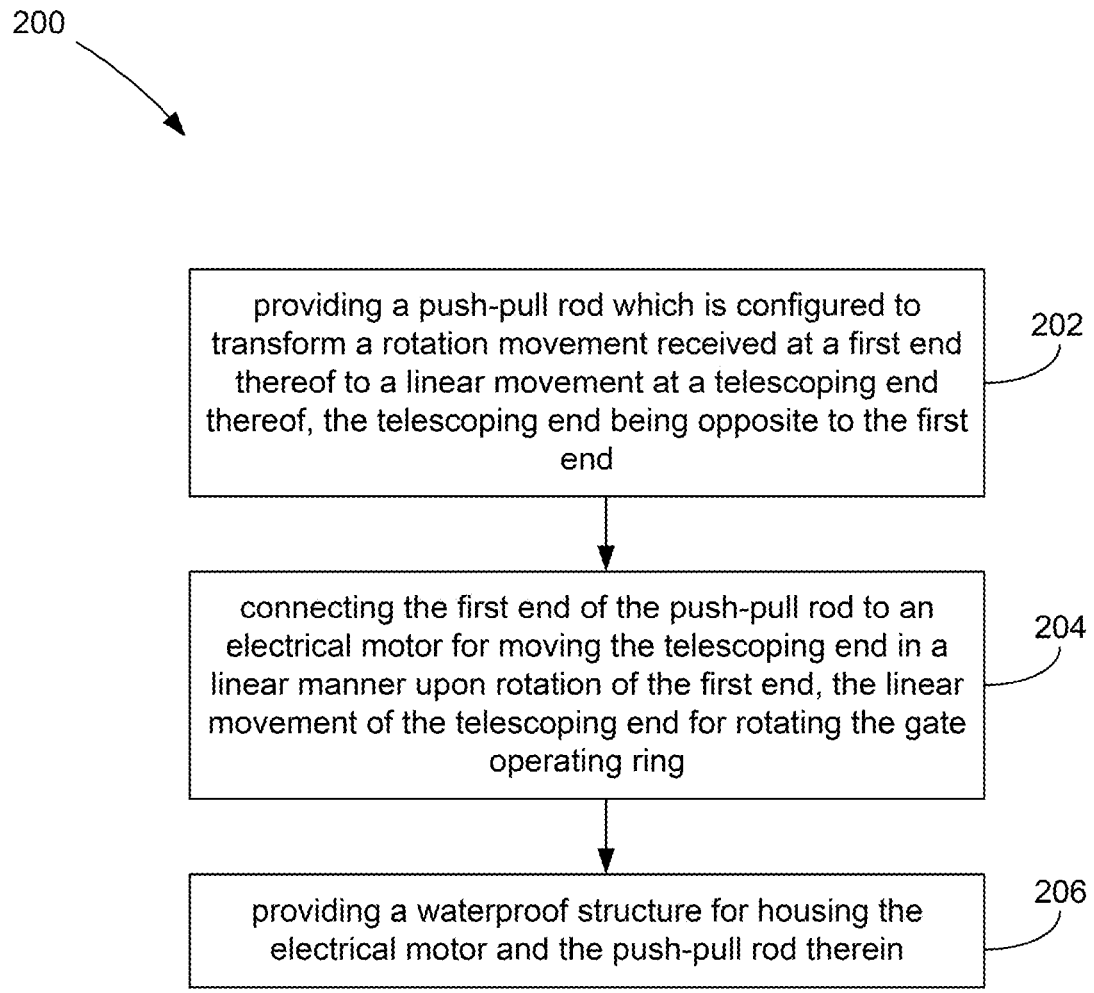
FIG. 7 is a flowchart of a method for controlling operation of a submersible hydro-electric production system comprising a plurality of wicket gates connected to a gate operating ring.

FIG. 7 is a flowchart of a method 200 for controlling operation of a submersible hydro-electric production system comprising a plurality of wicket gates connected to a gate operating ring. At step 202, the method comprises providing a push-pull rod which is configured to transform a rotation movement received at a first end thereof to a linear movement at a telescoping end thereof, the telescoping end being opposite to the first end. Step 204 comprises connecting the first end of the push-pull rod to an electrical motor for moving the telescoping end in a linear manner upon rotation of the first end, the linear movement of the telescoping end for rotating the gate operating ring. Step 206 comprises providing a waterproof structure for housing the electrical motor and the push-pull rod therein.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A submersible hydro-electric production system comprising:
   a turbine comprising a plurality of wicket gates configured to open and close to control a flow of water through the turbine;
   a wicket gate operating ring operably connected to the plurality of wicket gates for rotating the wicket gates between an open position and a closed position;
   one or more electrical actuators operably connected to the wicket gate operating ring and configured to rotate the gate operating ring to a desired position in response to a control signal;
   each electrical actuator comprising an electrical motor and a push-pull rod operably connected to the electrical motor for transforming a rotation movement of the electrical motor to a linear movement for rotating the gate operating ring to the desired position;
   each electrical actuator is provided in a waterproof housing that includes a waterproof casing comprising a flexible membrane, the casing for housing the electrical motor, and a telescoping tube protruding through the flexible membrane, the telescoping tube being configured to house the push-pull rod and extend and retract following the linear movement of the push-pull rod.

2. The system of claim 1, further comprising a waterproof power unit for providing the control signal received from outside the housing to the electrical motor.

3. The system of claim 2, wherein the casing, the membrane, the power unit and the telescoping tube conform to an IP68 waterproofing standard.

4. The system of claim 1, wherein the system comprises a first electrical actuator and a second electrical actuator connected at opposite sides of the gate operating ring.

5. The system of claim 4, wherein the first actuator and the second actuator have linear movements which are identical in speed and opposite in directions for rotating the gate operating ring.

6. A submersible hydro-electric production system comprising:
   a turbine comprising a plurality of wicket gates configured to open and close to control a flow of water through the turbine;
   a wicket gate operating ring operably connected to the plurality of wicket gates for rotating the wicket gates between an open position and a closed position;
   one or more electrical actuators operably connected to the wicket gate operating ring and configured to rotate the gate operating ring to a desired position in response to a control signal;
   each electrical actuator comprising an electrical motor and a push-pull rod operably connected to the electrical motor for transforming a rotation movement of the electrical motor to a linear movement for rotating the gate operating ring to the desired position;
   wherein the push-pull rod comprises:
   a primary shaft for connecting to a rotation shaft of the electrical motor;
   a cylinder comprising a plurality of secondary shafts provided around the primary shaft, the secondary shafts being connected to the cylinder and configured to cause linear movement of the cylinder upon rotation of the primary shaft.

7. The system of claim 1, wherein the electrical motor is a servomotor.

8. An electrical actuator for controlling an opening and a closing of a wicket gate operating ring in a submersible hydro-electric production system, the electrical actuator comprising:
   an electrical motor having a rotation shaft;
   a push-pull rod for connecting to the wicket gate operating ring, the push-pull rod being operably connected to the rotation shaft and being configured to transform a rotation movement of the rotation shaft to a linear movement for rotating the gate operating ring to a desired position; and
   a waterproof housing including:
   a waterproof casing comprising a flexible membrane, the casing for housing the electrical motor; and
   a telescoping tube protruding from the flexible membrane, the telescoping tube being configured to house the push-pull rod and being configured to extend and retract following the linear movement of the push-pull rod.

9. The electrical actuator of claim 8, wherein the electrical actuator is submersible and comprises an IP68 waterproof housing.

10. An electrical actuator for controlling an opening and a closing of a wicket gate operating ring in a submersible hydro-electric production system, the electrical actuator comprising:
    an electrical motor having a rotation shaft;
    a push-pull rod for connecting to the wicket gate operating ring, the push-pull rod being operably connected to the rotation shaft and being configured to transform a rotation movement of the rotation shaft to a linear movement for rotating the gate operating ring to a desired position;
    wherein the push-pull rod comprises:
    a primary shaft for connecting to a rotation shaft of the electrical motor;
    a cylinder comprising a plurality of secondary shafts provided around the primary shaft, the secondary shafts being connected to the cylinder and configured to cause linear movement of the cylinder upon rotation of the primary shaft.

11. The electrical actuator of claim 8, wherein the electrical motor is a servomotor.

12. A method for controlling operation of a submersible hydro-electric production system comprising a turbine with a plurality of wicket gates configured to open and close to control a flow of water through the turbine, the wicket gates are connected to a wicket gate operating ring operably connected to the plurality of wicket gates for rotating the wicket gates between an open position and a closed position, the method comprising:
    providing one or more electrical actuators operably connected to the wicket gate operating ring and configured to rotate the gate operating ring to a desired position in response to a control signal, each electrical actuator including an electrical motor and a push-pull rod operably connected to the electrical motor for transforming a rotation movement of the electrical motor to a linear movement for rotating the gate operating ring to the desired position;
    providing a waterproof housing for housing the electrical motor and the push-pull rod therein, the waterproof housing includes a waterproof casing comprising a flexible membrane, the casing for housing the electrical motor, and a telescoping tube protruding through the flexible membrane, the telescoping tube being configured to house the push-pull rod and extend and retract following the linear movement of the push-pull rod.

13. The method of claim 12, further comprising connecting the telescoping tube to the gate operating ring.

14. The method of claim 12, further comprising:
providing two different electrical motors and connecting telescoping tubes associated with the two different electrical motors to opposite sides of the gate operating ring; and
configuring the two electrical motors to rotate in opposite directions to cause rotation of the gate operating ring.

15. The method of claim 12, providing a control signal received from outside the waterproof housing to the electrical motor.

16. An electrical actuator for controlling operation of a wicket gate operating ring connected to a plurality of wicket gates in a submersible hydro-electric production system, the electrical actuator comprising:

an electrical motor having a rotation shaft;

a push-pull rod for connecting to the wicket gate operating ring, the push-pull rod being operably connected to the rotation shaft and being configured to transform a rotation movement of the rotation shaft to a linear movement for rotating the gate operating ring to a desired position;

the electrical actuator being submersible and comprising a waterproof housing comprising a waterproof casing comprising a flexible membrane and a telescoping tube extending through the flexible membrane, the waterproof casing being adapted to receive the electrical motor, and the telescoping tube being adapted to receive and be connected to the push-pull rod and extend and retract following the linear movement of the push-pull rod.

* * * * *